(12) United States Patent
Hagerman et al.

(10) Patent No.: US 6,697,643 B1
(45) Date of Patent: *Feb. 24, 2004

(54) SYSTEM AND METHOD FOR IMPLEMENTING A MULTI-BEAM ANTENNA WITHOUT DUPLEX FILTERS WITHIN A BASE STATION

(75) Inventors: Bo Hagerman, Stockholm (SE); Björn Johannisson, Kungsbacka (SE); Thomas Östman, Spanga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 664 days.

This patent is subject to a terminal disclaimer.

(21) Appl. No.: 09/687,913

(22) Filed: Oct. 13, 2000

(51) Int. Cl.[7] .................................................. H04B 1/38
(52) U.S. Cl. ..................... 455/562.1; 455/13.3; 455/561
(58) Field of Search ............................... 455/561, 562.1, 455/560, 403, 422.1–424, 453, 507, 13.3, 277.1, 277.2, 129; 343/373, 386, 372; 370/334

(56) References Cited

U.S. PATENT DOCUMENTS

| 5,576,717 A | * | 11/1996 | Searle et al. ................. 342/373 |
| 5,812,088 A | * | 9/1998 | Pi et al. ........................ 342/373 |
| 5,832,389 A | * | 11/1998 | Dent ........................ 455/562.1 |
| 5,924,020 A | * | 7/1999 | Forssen et al. ............. 455/129 |
| 6,151,513 A | * | 11/2000 | Petry et al. ............... 455/562.1 |
| 6,377,783 B1 | * | 4/2002 | Lo et al. ...................... 455/101 |
| 6,577,879 B1 | * | 6/2003 | Hagerman et al. ....... 455/562.1 |

FOREIGN PATENT DOCUMENTS

| EP | 0 883 208 A2 | 12/1998 |
| WO | WO 97/28615 | 8/1997 |

OTHER PUBLICATIONS

EPO International Search Report dated Jul. 20, 2001.

* cited by examiner

Primary Examiner—Nay Maung
Assistant Examiner—Edan Orgad

(57) ABSTRACT

The present invention is directed to cellular systems and methods for providing a multi-beam antenna configuration within a base station without utilizing duplex filters. The multi-beam antenna configuration of the present invention produces overlaid beams in both the uplink and downlink to cover the same area. Each beam has orthogonally oriented polarization directions (e.g., linear polarized slanted ±45°) for the uplink and downlink. Adjacent uplink beams shall also have shifted polarization directions in order to attain polarization diversity between different beams. In order to implement this polarization configuration, for each beam, there is a selective filter in front of the low noise amplifier for the uplink, and no duplex filter in front of the amplifier in the downlink direction.

16 Claims, 7 Drawing Sheets

SYSTEM AND METHOD FOR IMPLEMENTING A MULTI-BEAM ANTENNA WITHOUT DUPLEX FILTERS WITHIN A BASE STATION

BACKGROUND OF THE PRESENT INVENTION

1. Field of the Invention

The present invention relates generally to base stations within cellular systems, and specifically to base stations utilizing multi-beam antennas.

2. Background and Objects of the Present Invention

The majority of cellular systems currently allocate the uplink and downlink transmissions in two different frequency bands with simultaneous transmission in both bands. These cellular systems have conventionally included base stations (BS's) that utilize either a single omni antenna or a single sector antenna (typically 120° coverage per sector) for both transmission and reception, for aesthetic reasons and to reduce the costs associated with the antennas, feeders and installation.

To increase the coverage and capacity of systems, adaptive antenna systems using multi-beam antenna arrays have been developed. The narrow beams of the antenna array can be used to increase the sensitivity of the uplink, and to reduce the interference in both the uplink and the downlink. In addition, for diversity purposes, dual polarized antennas are becoming more commonplace, since fading is uncorrelated in orthogonal polarization directions. Traditionally, both polarization directions are used in the uplink, while only one of the polarization directions is selected for the downlink.

A number of proposals for cellular systems employing antenna arrays have been published. Reference is made to the following articles and patents: Forssen et al., "Adaptive Antenna Array for GSM900/DCS1800," Proc. 44th Vehicular Technology Conference, Stockholm, June 1994; Hagerman et al., "Adaptive Antennas in IS-136 Systems," Proc. 48th Vehicular Technology Conference, Ottawa,, May 1998; U.S. Pat. No. 5,515,378 to Roy, III et al.; and PCT International Application WO 95/34102 to Forssen et al., each of which is hereby incorporated by reference.

Reference is now made to FIGS. 1 and 2 of the drawings, which show a block diagram of a conventional multi-beam antenna array 50 and a typical beam configuration from a conventional multi-beam antenna array 50, respectively. As shown in FIG. 1, present multi-beam antenna array 50 configurations typically include at least one antenna aperture 55 consisting of several rows and columns of radiating elements. The antenna array 50 generates a plurality of narrow azimuth beams or lobes (shown in FIG. 2) via beamports using the full array 50, where the direction and shape of the antenna beams (Beams 1, 2, 3 and 4) are determined by one or more beamforming networks 46 connected to the columns of the array 50. The beamforming networks 46a and 46b utilizes signal amplitude and phase relations between different columns of the array 50 to create the beams.

Typically, the multi-beam antenna arrays 50 have one duplex filter 70 connected to each antenna beam or one duplex filter per antenna column. Each duplex filter 70 is responsible for selecting the appropriate signal for transmission on the downlink and for selecting the appropriate signal for reception on the uplink. Normally, there will also be an additional selective filter 60 in front of each low noise amplifier (LNA) 40 in the uplink.

For example, as shown in FIGS. 1 and 2, if the two orthogonal polarization directions are approximately linear polarized slanted ±45°, with the downlink using only one of the polarization directions (here +45°) and the uplink using both polarization directions (+45°), the beamforming network 46a that produces the +45° polarization direction includes duplex filters 70 to handle both the uplink and downlink signal selections, while the beamforming network 46b that produces the −45° polarization direction includes only selective filters 60 to handle the downlink signal selections.

Unfortunately, the duplex filters 70 in current systems introduce losses to the transmitted and received signals in the system. These losses result in smaller coverage areas for the base station's implementing multi-beam antenna configurations. To make these losses manageable, and therefore to increase the coverage area of the base station's, large cavity filters are typically used. However, large cavity filters are expensive and require a large amount of volume, especially for multi-beam arrays where several parallel filters are required, one for each beam.

The possible alternative of using two different antennas, one for the uplink and one for the downlink, will only add additional cost for the feeder and antenna hardware as well as for installation. In addition, two antennas are often impossible to implement due to aesthetic reasons.

It is, therefore, an object of the present invention to provide a multi-beam antenna configuration without utilizing duplex filters.

SUMMARY OF THE INVENTION

The present invention is directed to cellular systems and methods for providing a multi-beam antenna within a base station without utilizing duplex filters. The multi-beam antenna of the present invention produces overlaid beams in both the uplink and downlink to cover the same area. Each beam has orthogonally oriented polarization directions (e.g., linear polarized slanted ±45°) for the uplink and downlink. Adjacent uplink beams also have shifted polarization directions in order to attain polarization diversity between different beams. In order to implement this polarization configuration, for each beam, there is a selective filter in front of the low noise amplifier for the uplink, and no duplex filter in front of the amplifier in the downlink direction. In the simplest form, this solution is also applicable to antennas with broad sector-coverage beams, where one polarization is used in uplink and the other in downlink. Advantageously, by removing the duplex filters from the multi-beam antenna, the downlink losses are reduced. Similarly, since the total amount of filters are reduced, the total cost and volume required for the antenna system is reduced.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
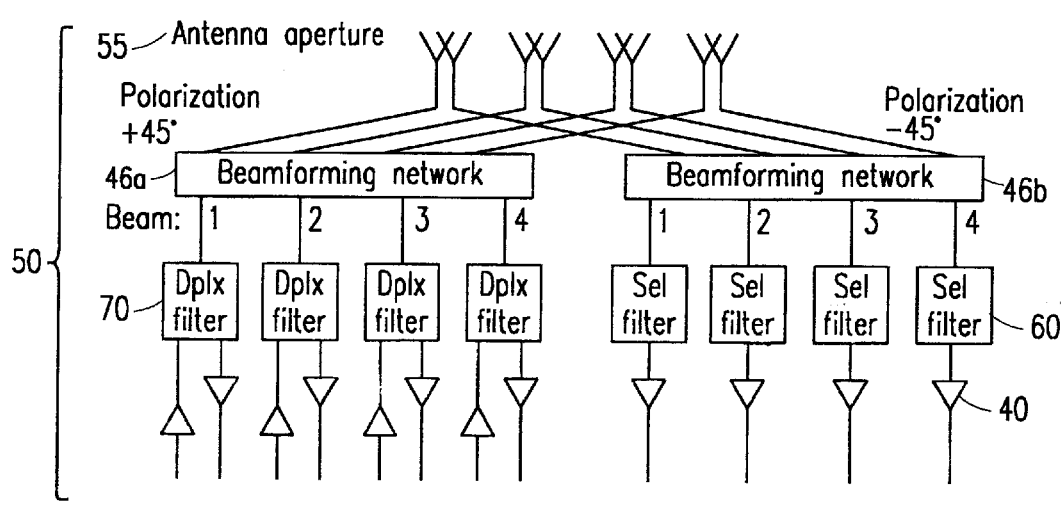
FIG. 1 is a block diagram of a conventional multibeam array.
Figure 2:
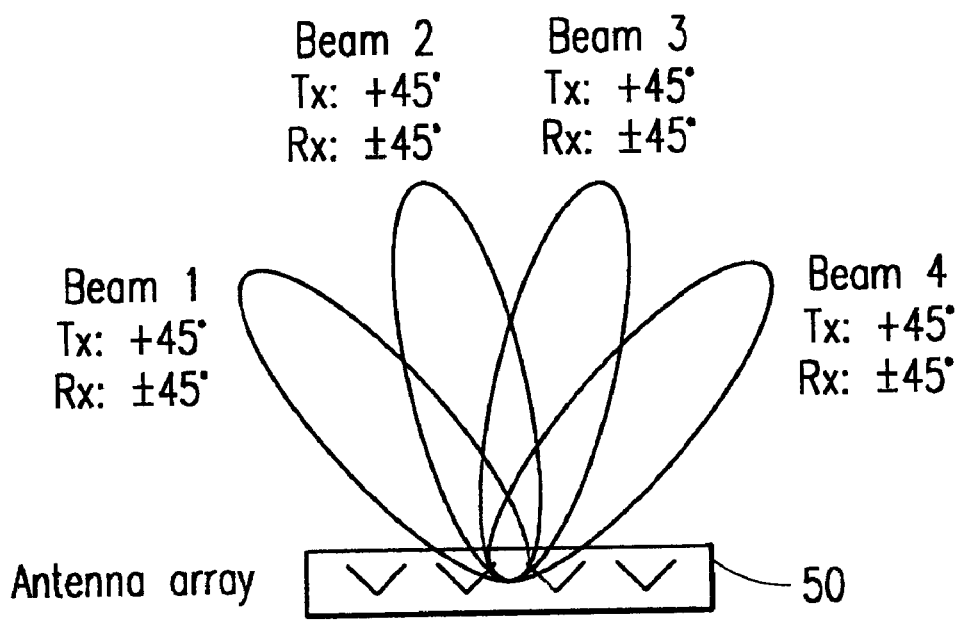
FIG. 2 illustrates a beam configuration from a conventional multibeam array of the type shown in FIG. 1 of the drawings.
Figure 3:
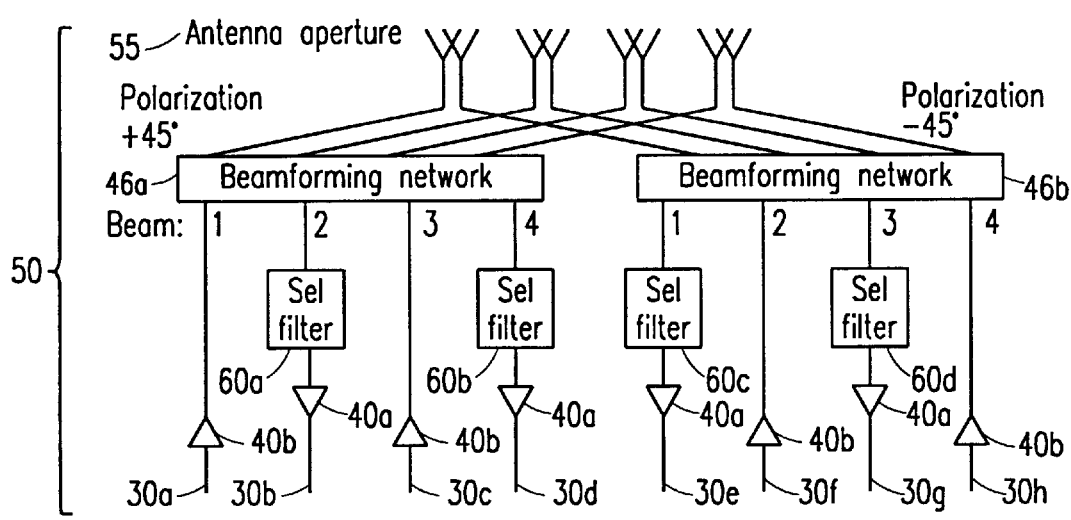
FIG. 3 is a block diagram of a multibeam antenna array in accordance with embodiments of the present invention.
Figure 4:
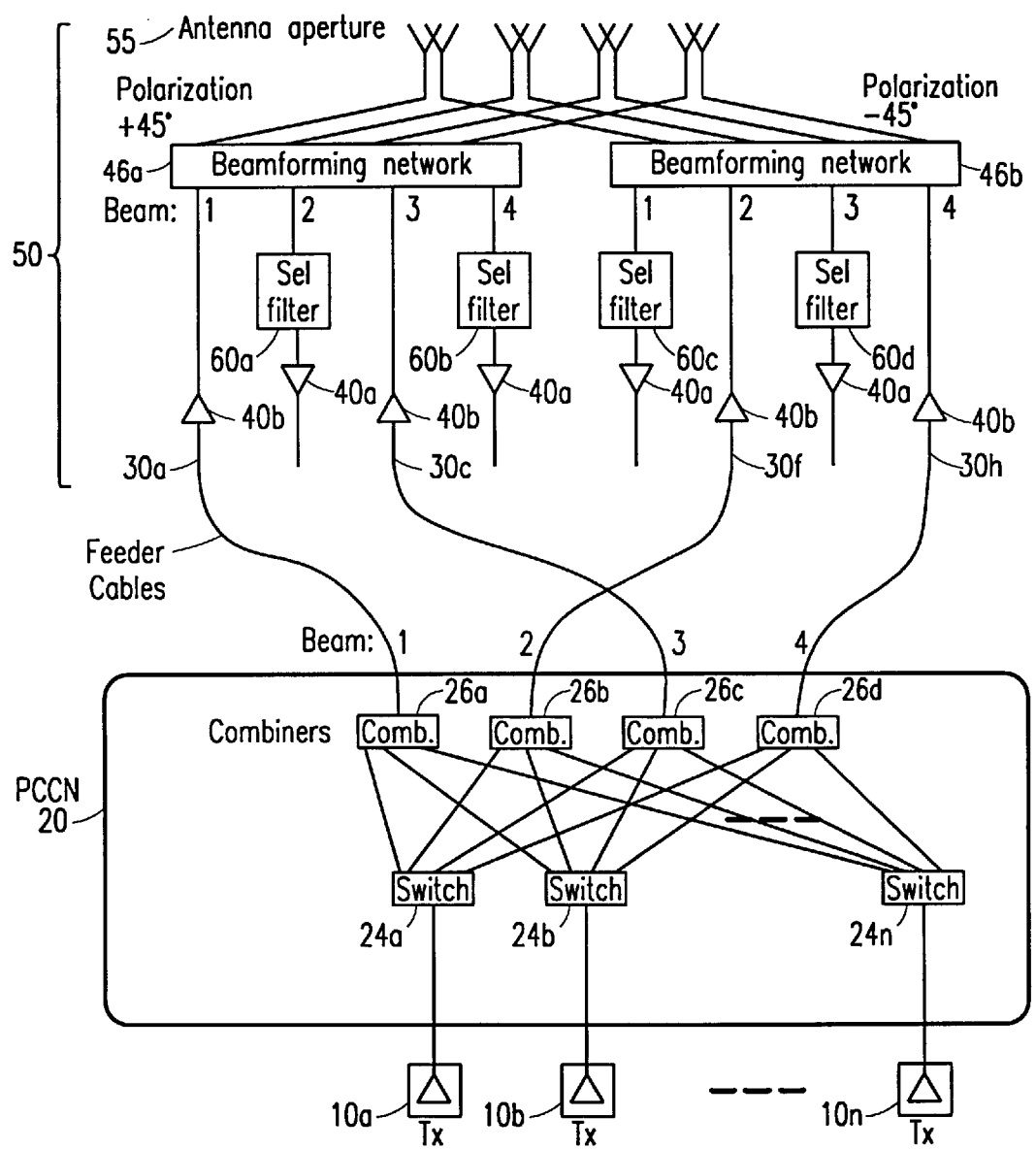
FIG. 4 is a block diagram of an antenna configuration utilizing the multibeam antenna array shown in FIG. 3 of the drawings.
Figure 5:
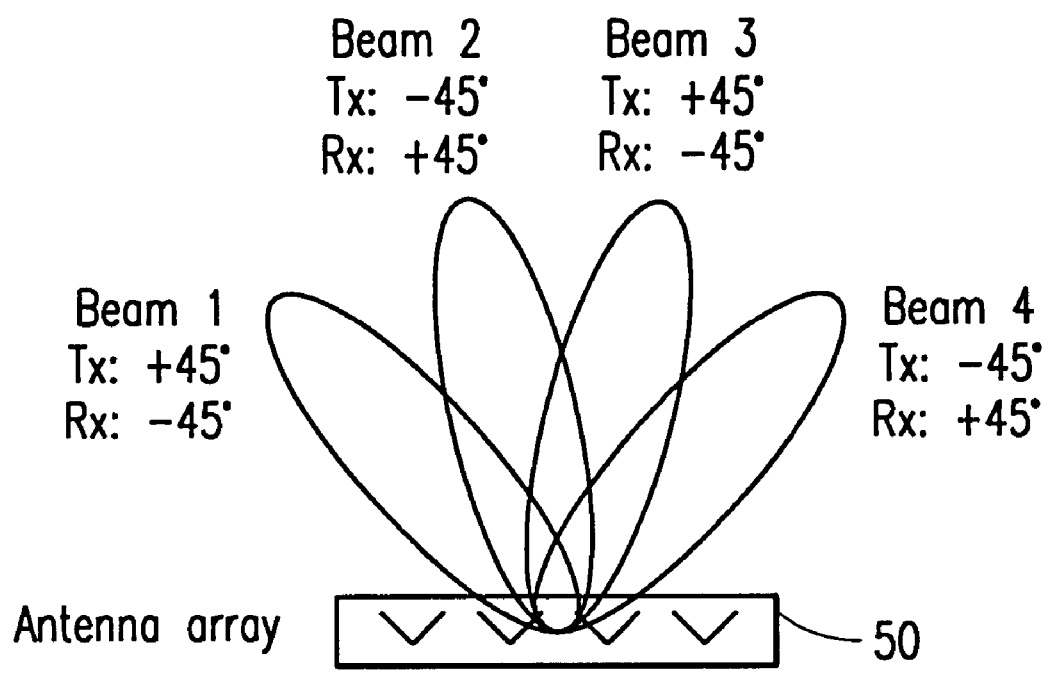
FIG. 5 illustrates a beam configuration from the antenna array shown in FIG. 4 of the drawings in accordance with embodiments of the present invention.

With reference to FIGS. 3–5 of the drawings, a multi-beam antenna array 50 for use within a base station within a cellular system without utilizing duplex filters in accordance with embodiments of the present invention is shown. The multi-beam antenna array 50 produces either overlaid beams (same angular beam direction) in both the uplink and downlink to cover the same area, as shown, or may produce beams whose angular directions do not exactly coincide in both the uplink and downlink to cover the entire area. Each beam has orthogonally oriented polarization directions (e.g., linear polarized slanted ±45°) for the uplink and downlink. Adjacent uplink beams also have shifted polarization directions in order to attain polarization diversity between different beams.

As shown in the example of FIG. 3, the antenna array 50 has four beams (beams 1, 2, 3 and 4), each of which are utilized for both the uplink and the downlink. On the downlink, one polarization (+45°) is used for beams 1 and 3 while the other polarization (−45°) is used for beams 2 and 4. By contrast, on the uplink, the −45° polarization is used for beams 1 and 3 while the other polarization (+45°) is used for beams 2 and 4.

There is also a selective filter 60 in front of each low noise amplifier 40a for each beam in the uplink, and no duplex filter in front of any of the amplifiers 40b, which are typically power amplifiers, for the beams in the downlink. The selective filters 60 in the uplink serve to select the appropriate signal(s) for reception on the uplink. The signals that are to be transmitted on the downlink are selected before the signals reach the antenna feeder cables 30 for the downlink, which will be discussed in more detail in connection with FIG. 4 below.

For transmission on the downlink, after amplification by the respective amplifiers 40b, the signals received on antenna feeder cables for the downlink, here antenna feeder cables 30a, 30c, 30f and 30h, are per individual feeder connected coherently via the corresponding beamports to all elements in the antenna array 50. This is accomplished by sending all of the signals for each beam (1, 2, 3 and 4) to a respective beamforming network 46a or 46b, where the direction and shape of the beams are formed. Each beam-forming network 46 is associated with a different polarization. For example, as shown in FIG. 3, beams 1 and 3 are linear polarized slanted +45° by beamforming network 46a, while beams 2 and 4 are linear polarized slanted −45° by beamforming network 46b.

Each beamforming network 46 is connected to all elements of the antenna array 50 with the corresponding polarization (shown in FIG. 5) to generate the beams. Therefore, once generated, the signals for each beam are transmitted from the antenna aperture 55 (shown in FIG. 3) towards the mobiles in the cell associated with the base station.

For reception on the uplink, all signals that are received at the antenna aperture 55 are received on all elements of the antenna array 50, which responds by creating signals that will be received at the beamforming networks 46. The received signals from all elements of the antenna array 50 go through the beamforming networks 46 where they are differently combined to create each beam. Thus, some of the received signals corresponding to the antenna polarization of +45 degrees will be received at beamforming network 46a, while others corresponding to the antenna polarization of −45 degrees are received at beamforming network 46b.

Thereafter, the signals are passed through the selective filters 60a or 60b on beams 2 or 4, respectively, for +45° polarized signals, while other signals are passed through the selective filters 60c or 60d on beams 1 or 3, respectively, for −45° polarized signals. Once the signals are selected and amplified using the low noise amplifiers 40a on the uplink, the signals are transmitted through to the base station on their respective uplink antenna feeder cables, here antenna feeder cables 30b, 30d, 30e and 30g.

With reference now to FIG. 4 of the drawings, an antenna configuration for transmission on the downlink implementing the antenna array 50 shown in FIG. 3 is shown. Initially, one or more radio transmitters (Tx) 10a, 10b . . . 10n, each corresponding to a different signal, are connected to a Pre-Combining-Carrier-Network (PCCN) 20 in the base station, which is preferably integrated in the base station cabinet. In the PCCN 20, the signals from each Tx 10a, 10b . . . 10n are switched to the desired radiation pattern. In addition, in the PCCN 20, each signal (time slot, code and/or carrier frequency) is directed (routed) to the correct beam, and all simultaneous signals for each beam are combined.

In the PCCN 20, the signals for the various time slots in each carrier frequency from each Tx 10a, 10b . . . 10n are sent to their respective switches 24a, 24b . . . 24n, respectively, in the PCCN 20. Each switch 24 sends the signal for each received signal to one combiner 26, which serves to combine all of the signals received from the switches 24 into the beam associated with that combiner 26. Therefore, each combiner 26a, 26b, 26c and 26d is associated with a separate downlink antenna feeder cable 30a, 30c, 30f and 30h respectively. Thereafter, the signals from each feeder cable 30 are transmitted from the PCCN 20 to the antenna system 50 in the base station, where the signals are transmitted as discussed above in connection with FIG. 3.

Figure 6:
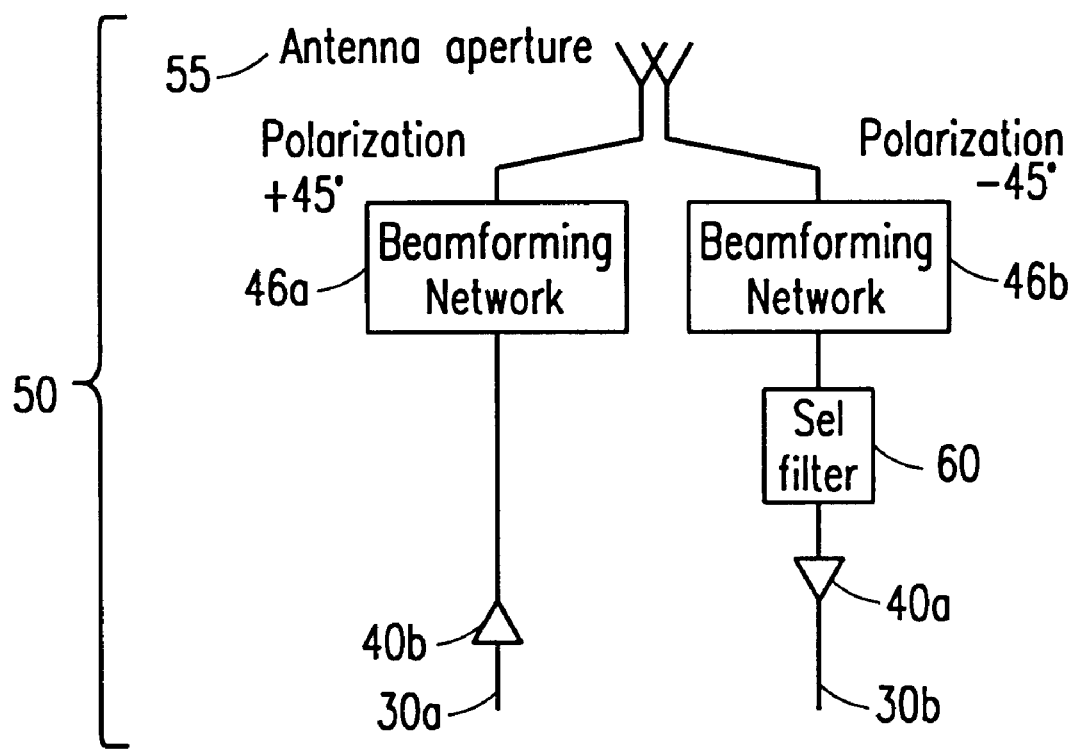
FIG. 6 is a block diagram of a sector antenna in accordance with embodiments of the present invention.
Figure 7:
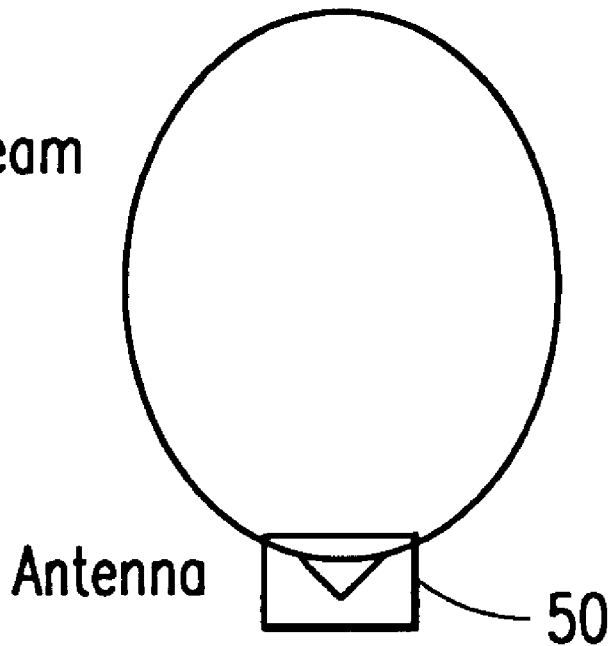
FIG. 7 illustrates a beam configuration from the sector antenna shown in FIG. 6 of the drawings in accordance with embodiments of the present invention.

It should be noted that the antenna system described herein can be applied to antennas having any arbitrary number of beams in the uplink and downlink. For example, in the simplest form, the antenna configuration described hereinbefore can also be applicable to antennas with broad sector-coverage beams, where one polarization is used in uplink and the other in downlink, such as is illustrated in FIGS. 6 and 7. In this case, as shown in FIG. 7, the antenna 50 produces one overlaid beam in both the uplink and downlink to cover the entire sector. As shown in FIG. 6, all of the signals received on the uplink at the antenna aperture 55 are passed through the −45° beamforming network 46b, while all of the signals for transmission on the downlink are passed through the +45° beamforming network 46a to the antenna aperture 55. In this case, the beamforming networks 46a and 46b only have one beam port each, but may still have more than one antenna element connected both in the vertical and horizontal planes.

Just as discussed above in connection with FIGS. 3 and 4, in FIG. 6, there is also a selective filter 60 in front of the low noise amplifier 40a for the uplink, and no duplex filter in front of the amplifier 40b for the downlink direction. As discussed before, the selective filter 60 in the uplink serves to select the appropriate signal(s) on the uplink for transmission through the base station via the uplink antenna feeder cable 30b, and the signals that are to be transmitted on the downlink are selected before the signals reach the antenna feeder cable 30a for the downlink.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. An antenna within a cellular network for transmitting and receiving signals, comprising:

first and second beamforming networks feeding substantially orthogonally oriented polarization directions with respect to each other, said first and second beamforming networks producing at least one beam each for simultaneous transmission and reception of signals within said cellular network, each pair of said at least one beam from said first beamforming network and said at least one beam from said second beamforming network having only one of said polarization directions for transmission of signals on the downlink and only the other of said polarization directions for reception of signals on the uplink.

2. The antenna of claim 1, wherein each said pair of beams from said first and second beamforming networks point in substantially the same angular direction.

3. The antenna of claim 1, wherein each said pair of beams from said first and second beamforming networks point in angular directions that do not coincide.

4. The antenna of claim 1, further comprising:

at least one downlink antenna feeder cable connected to one of said first and second beamforming networks for transmission of signals on the downlink within said at least one beam; and at least one uplink antenna feeder cable connected to the opposite one of said first and second beamforming networks than said at least one downlink antenna feeder cable for reception of signals on the uplink within said at least one beam.

5. The antenna of claim 4, further comprising:

a respective amplifier connected to each of said at least one downlink and uplink antenna feeder cables.

6. The antenna of claim 5, further comprising:

a respective selective filter connected to each of said respective amplifiers on only said at least one uplink antenna feeder cable.

7. The antenna of claim 1, wherein said antenna comprises an antenna array and said first and second beamforming networks produce at least two beams for simultaneous transmission and reception of signals within said network.

8. The antenna of claim 7, wherein adjacent ones of said at least two beams have orthogonally oriented polarization directions with respect to each other for reception of signals on the uplink and orthogonally oriented polarization directions with respect to each other for transmission of signals on the downlink.

9. A method for transmitting and receiving signals by an antenna within a cellular network, comprising the steps of:

providing first and second beamforming networks feeding substantially orthogonally oriented polarization directions with respect to each other; and producing, by said first and second beamforming networks, at least one beam each for simultaneous transmission and reception of signals within said cellular network, each pair of said at least one beam from said first beamforming network and said at least one beam from said second beamforming network having only one of said polarization directions for transmission of signals on the downlink and only the other of said polarization directions for reception of signals on the uplink.

10. The method of claim 9, wherein each said pair of beams from said first and second beamforming networks point in substantially the same angular direction.

11. The method of claim 9, wherein each said pair of beams from said first and second beamforming networks point in angular directions that do not coincide.

12. The method of claim 9, wherein said step of producing further comprises the steps of:

transmitting signals on the downlink within said at least one beam using at least one downlink antenna feeder cable connected to one of said first and second beamforming networks; and receiving signals on the uplink within said at least one beam using at least one uplink antenna feeder cable connected to the opposite one of said first and second beamforming networks than said at least one downlink antenna feeder cable.

13. The method of claim 12, wherein each of said at least one downlink and uplink antenna feeder cables has a respective amplifier connected thereto.

14. The method of claim 13, wherein each of said respective amplifiers on only said at least one uplink antenna feeder cable has a respective selective filter connected thereto.

15. The method of claim 9, wherein said antenna comprises an antenna array and wherein said step of producing further comprises the step of:

producing at least two beams for simultaneous transmission and reception of signals within said network.

16. The method of claim 15, wherein adjacent ones of said at least two beams have orthogonally oriented polarization directions with respect to each other for reception of signals on the uplink and orthogonally oriented polarization directions with respect to each other for transmission of signals on the downlink.

* * * * *